United States Patent [19]
Ohishi et al.

[11] Patent Number: 6,137,489
[45] Date of Patent: Oct. 24, 2000

[54] COMMUNICATION APPARATUS FOR ASSOCIATING MULTIMEDIA FILES WITH ELECTRONIC MAIL

[75] Inventors: Kazuhiro Ohishi; Takahiro Kii; Kyoko Okuyama; Naomi Iwayama, all of Kawasaki, Japan

[73] Assignee: Fujitsu Limited, Kawasaki, Japan

[21] Appl. No.: 08/974,247

[22] Filed: Nov. 19, 1997

[30] Foreign Application Priority Data

Jul. 15, 1997 [JP] Japan ................................. 9-190221

[51] Int. Cl.⁷ ...................................... G06F 13/00
[52] U.S. Cl. .......................... 345/339; 345/347; 345/329
[58] Field of Search .................................... 345/339, 347, 345/357, 961, 329, 326

[56] References Cited

U.S. PATENT DOCUMENTS

| | | | |
|---|---|---|---|
| 5,283,638 | 2/1994 | Engberg et al. | 348/14 |
| 5,495,284 | 2/1996 | Katz | 348/15 |
| 5,521,966 | 5/1996 | Friedes et al. | 379/91 |
| 5,579,472 | 11/1996 | Keyworth, II et al. | |
| 5,664,126 | 9/1997 | Hirakawa et al. | 345/329 |
| 5,873,095 | 2/1999 | Gore | 707/200 |
| 5,907,324 | 5/1999 | Larson et al. | 345/330 |

FOREIGN PATENT DOCUMENTS 7-336745  12/1995  Japan .
7-336747  12/1995  Japan .

*Primary Examiner*—Raymond J. Bayerl
*Assistant Examiner*—Cao H. Nguyen
*Attorney, Agent, or Firm*—Staas & Halsey, LLP

[57] ABSTRACT

A communication apparatus which enables a user to have a more concrete image of a communication partner and to experience the fun of communication through a personal computer, wherein upon receipt of an article, a material representing a person who sent the article or a sending place is reproduced by means of a still picture, animation or sound corresponding to the person who sent the article, to the sending place or to the geographical relationship between the sending place and receiving place.

20 Claims, 13 Drawing Sheets

COMMUNICATION APPARATUS FOR ASSOCIATING MULTIMEDIA FILES WITH ELECTRONIC MAIL

BACKGROUND OF THE INVENTION

The present invention relates to a communication apparatus such as a personal computer in which upon receipt of an article such as an electronic mail from a sender, it is expressed with a still picture, animation or sound based on personal information such as a name and age, on geographical information such as a distance from the sender, geographical features or place name, and on meteorological information such as a climate that the article has been sent from the particular sender.

In recent years, personal computer network and the Internet have become broadly popular, and it is desired for such communication systems using network to provide a user interface which is easy to operate also for children or beginners and which enables enjoyable communication.

When an article such as an electronic mail sent through a network arrives, a user requests a server for a list of articles, whereupon a list by text is displayed which contains names of senders, sending date and time, title, destination (addressee), identification (ID) information, etc. The user then downloads from the server the article he or she wishes to read.

Such list of articles by means of text being uniform and abstract, it tends to be quite uninteresting especially for children. Since children can not experience the fun of communication through an electric mail, they hardly have a desire to positively use a personal computer. With these points in mind, a communication system which prepares multimedia information suitable for children, such as pictures of lovely designs or sound effect to visually and auditorially materialize abstract concepts such as sending/receiving of articles to attract children attention by using the multimedia information.

In such conventional communication system as explained above, it can be concretely experienced with eyes and ears that he or she is communicating through the personal computer. However, it does not offer a service of providing more concrete data concerning who has sent the article from what kind of place or beyond what kind of place, although such data would lead to have the user (which may not always be children) a more concrete image, thereby making the user interested in communicating through the personal computer and letting him or her experience the fun of communication by using the personal computer.

BRIEF SUMMARY OF THE INVENTION

The present invention has been made to solve the above problems, and it is a purpose of the present invention to provide a communication apparatus which enables a user to have a more concrete image of his or her communicating partner and to experience the fun of communication by using a personal computer, wherein upon receipt of an article by utilizing information like a mail address, a material representing a sender or sending place is reproduced by means of a still picture, animation or sound corresponding to the sender, sending place or a geographical relationship between the sending place and the receiving place.

In the communication apparatus according to the present invention, attribute information of the sender and addressee, e.g. personal information (name, address, etc.) or environmental information (geographical features, meteorology, etc.), are stored in database together with materials such as a still picture, animation or sound which are for representing who has sent the article from what kind of place and beyond what kind of geographical space until the article has been received. The apparatus then performs the following steps: (1) extracting from the received article an information which specifies the sender of the article such as a mail address; (2) extracting attribute information corresponding to the sender and addressee from the database based on the specifying information obtained in (1); (3) selecting a material following a rule for selecting a material corresponding to the extracted attribute information; and (4) reproducing the selected material through a display or loudspeaker.

Hence, information concerning who has sent the article from what kind of place beyond what kind of geographical space are materialized so that the user is enabled to have a more concrete image of the communicating partner and to experience the fun of communication by using a personal computer.

The above and further objects and features of the invention will more fully be apparent from the following detailed description with accompanying drawings.

DETAILED DESCRIPTION OF THE INVENTION

[Embodiment 1]

Figure 1:
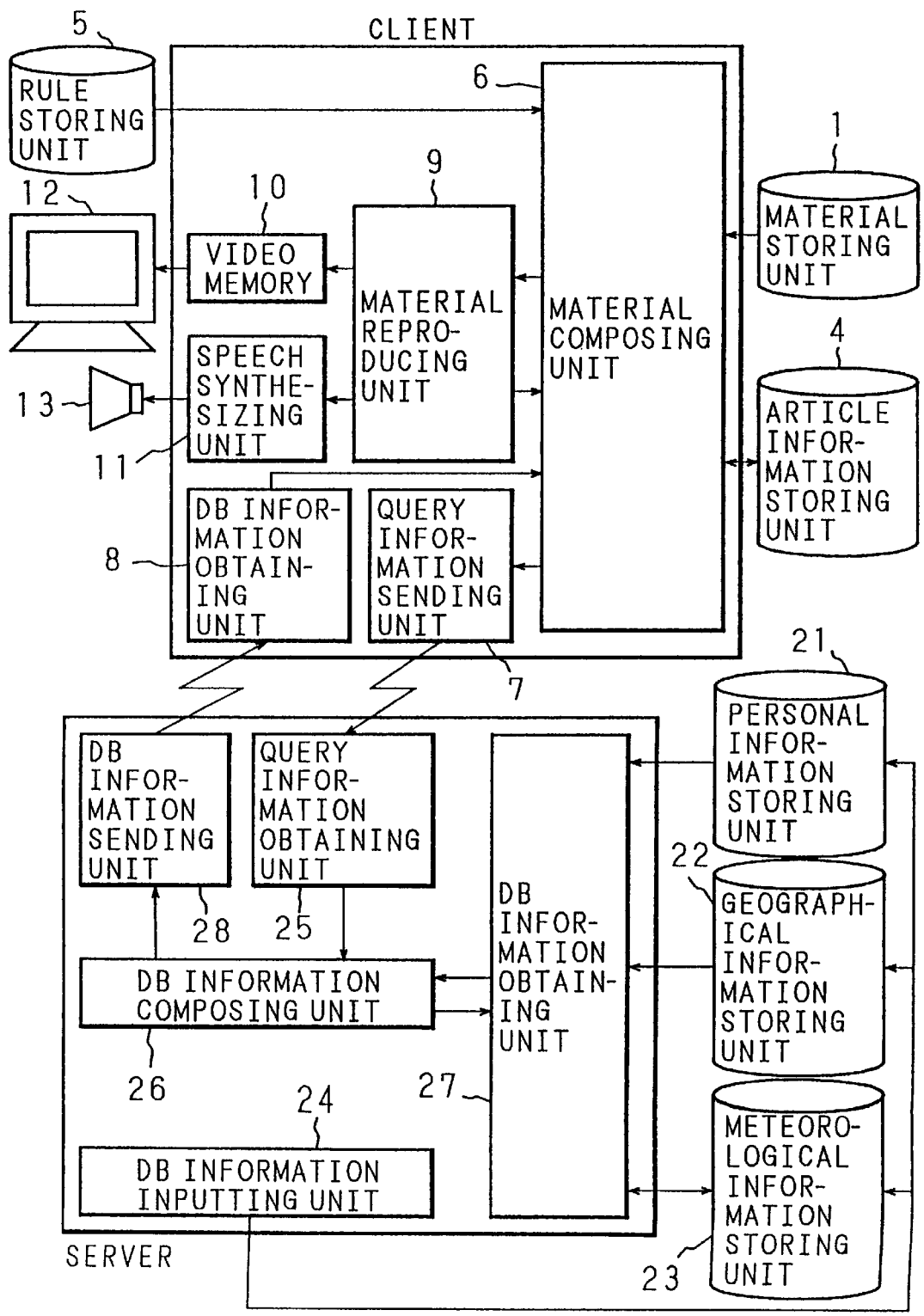
FIG. 1 is a block diagram showing one example of an arrangement of a communication apparatus according to the present invention.

FIG. 1 is a block diagram showing one example of an arrangement of a communication system of client-server type which is the communication apparatus according to the present invention (hereinafter referred to as "the apparatus of the present invention").

A material storing unit 1 stores materials therein as information in a form of a still picture, animation or sound, wherein these materials are based on personal information of a sending/addressee (e.g. name/age: child, student, adult, male, female, aged, etc.; belonging organization: doctor, employee of a company, etc.; address: home, office, etc.) and on environmental information of the sending place/receiving (e.g. geography: geographical features: sea, mountain, river etc.; information specifying place names: prefecture name, city name, etc.; structures: bridge, tower, etc.; and meteorology: sky, star, sun, clouds, thunder. etc.)

An article information storing unit 4 stores therein articles such as electronic mails. If the article is an electronic mail, the mail address of the sender described on a header of the mail is the information specifying the sender.

A rule storing unit 5 stores therein material composing rules for obtaining a material to be selected from the material storing unit 1 for reproducing a material corresponding to the attribute information. Examples of such materials to be selected are as follows: if the weather is (sunny) and the time zone is (morning), a material "sky" (a picture of a sky with the morning glow); if the weather is (sunny) and the time zone is (day), a material "sky" (a picture of a blue sky); if the weather is (sunny) and the time zone is (at dusk), a material "sky" (a picture of a sky with the evening glow); if the weather is (sunny) and the time zone is (night), a material "sky" (a picture of a starry sky); if the geography is (sea) and the time zone is (morning), a material "sea" (a picture of a sea with the morning glow); if the geography is (sea) and the time zone is (day), a material "sea" (a picture of a calm sea); if the geography is (sea) and the time zone is (at dusk), a material "sea" (a picture of a sea with the evening glow); if the geography is (sea) and the time zone is (night), a material "sea" (a picture of a sea in darkness); etc.

A material composing unit 6 extracts from the article which has been received and stored in the article information storing unit 4 information specifying the sender of the article which may be a mail address if the article is an electronic mail. The material composing unit 6 passes the mail address to a query information sending unit 7 as a query information which is to be sent to the server to obtain attribute information of the sender.

The material composing unit 6 also selects a material from the material storing unit 1 by referring to the rule storing unit 5 and following a rule corresponding to the attribute information of the sender which have been sent out from the server (as will be described later), and it further generates a format file of a material corresponding to the attribute information of the sender which is then passed to a material reproducing unit 9.

The query information sending unit 7 sends out the query information to the server which have been passed thereto from the material composing unit 6.

A personal information storing unit 21 of the server stores therein personal information such as an address, name, gender, age, etc., of the sender in accordance with the mail address of the person who sent the article.

A geographical information storing unit 22 stores therein geographical information such as a place name of each city (each prefecture, each district, each country, etc.), position (latitude/longitude), characteristic geographical features (sea, mountain, river, etc.) or a characteristic structure (building, bridge, tower, etc.).

A meteorological information storing unit 23 stores therein short-term and long-term meteorological information (sunny, rainy, cloudy, snowy, etc.) of each city (each prefecture, each district, each country, etc.).

These personal and environmental (geographical and meteorological) information are input through a DB (database) information inputting unit 24 which may be a keyboard, mouse, communication modem, etc. Especially time-varying information such as meteorological information may be regularly input by means of e.g. communication channels from a different server providing such information.

A query information obtaining unit 25 of the server obtains query information sent out from the query information sending unit 7 of the client to pass it to a DB information composing unit 26.

The DB information composing unit 26 passes the query information which have been passed thereto from the query information obtaining unit 25 to a DB information obtaining unit 27, or passes personal information of the sender, geographical and meteorological information of the sending place which have been obtained by the DB information obtaining unit 27 to a DB information sending unit 28.

The DB information obtaining unit 27 obtains the following information which are respectively passed to the DB information composing unit 26: personal information of the sender from personal information storing unit 21, based on the mail address of the sender which has been passed as query information; geographical information of the sending place from geographical information storing unit 22, based on the personal information; and meteorological information from meteorological information storing unit 23.

The DB information sending unit 28 sends out database information to the client which are personal, geographical or meteorological information that have been passed by the DB information composing unit 26.

A DB information obtaining unit 8 of the client obtains database information, namely attribute information of the sender, sent out from the DB information sending unit 28 of the server, and passes the information to the material composing unit 6.

A material reproducing unit 9 successively sends still picture and animation data of a material selected from the material storing unit 1 by the material composing unit 6 to a video memory 10 and further sends sound data to a speech synthesizing unit 11. Image data from the video memory 10 are output to a displaying unit 12 such as a liquid crystal display, and the speech synthesizing unit 11 synthesizes a speech sound from the sound data to output the synthesized speech sound from a loudspeaker 13.

[Embodiment 2]

Figure 2:
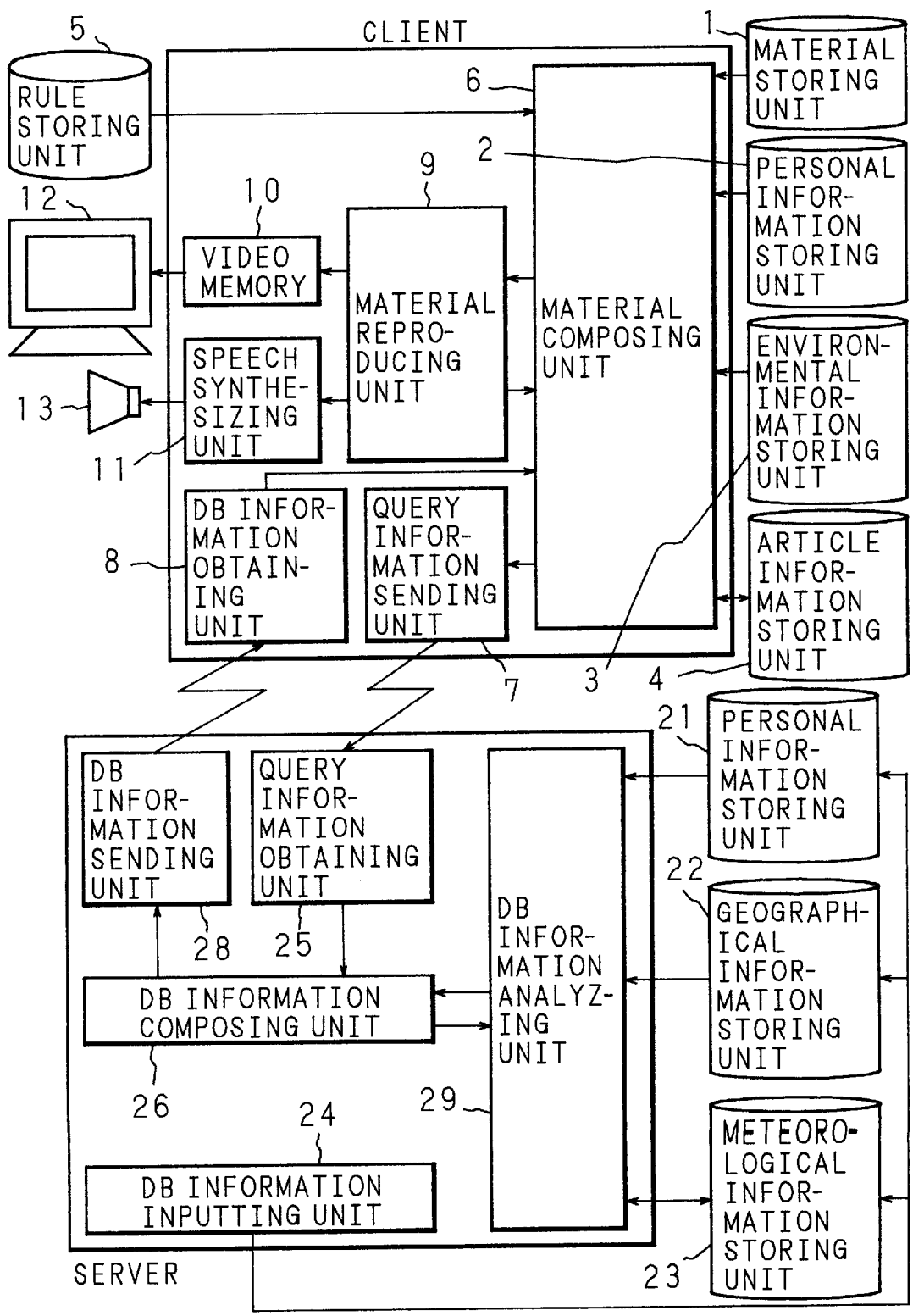
FIG. 2 is a block diagram showing another example of an arrangement of a communication apparatus according to the present invention.

FIG. 2 is a block diagram showing another example of an arrangement of a communication system of client-server type which is the apparatus of the present invention. It should be noted that portions which are identical with those of embodiment 1 as shown in FIG. 1 is marked with the same reference numerals, and any explanations will be deleted. In this embodiment, materials are selected based on attribute information of both, the sender and addressee.

A personal information storing unit 2 stores therein personal information such as address, name, gender, age, etc., of an addressee in accordance with a mail address of the addressee who receives an article.

In this embodiment, an environmental information storing unit 3 stores therein environmental information of the receiving place which includes the name of the computer of the client (name of host) and its location (address/building name).

A material composing unit 6 obtains the mail address of the sender from an article information storing unit 4, personal information of the addressee from the personal information storing unit 2, and environmental information of the receiving place from the environmental information storing unit 3, and these personal and environmental information are sent to a query information sending unit 7 along with the mail address as query information to be sent out to the server in order to obtain attribute information of the sender or information concerning the geographical relationship between the sender and addressee.

The query information sending unit 7 sends out query information to the server which have been passed thereto from the material composing unit 6.

A query information obtaining unit 25 of the server obtains query information sent out from the query information sending unit 7 of the client to pass them to a DB information composing unit 26. The DB information composing unit 26 passes the query information passed from the query information obtaining unit 25 to a DB information analyzing unit 29.

The DB information analyzing unit 29 of the server obtains the following information which are respectively passed to the DB information composing unit 26: personal information of the sender from a personal information storing unit 21; geographical information of the sending place from a geographical information storing unit 22, based on the personal information; and meteorological information of the sending place from a meteorological information storing unit 23.

The DB information analyzing unit 29 analyzes, by referring to the geographical information storing unit 22, information concerning the geographical relationship between the sending place and the receiving place such as a distance, geographical features or structures between these two points, based on the latitude/longitude of the receiving place obtained from environmental information of the addressee (location of the computer of the client) and based on geographical information (latitude/longitude) of the sending place which have been sent out from the client as query information. The resulting analyzed information are passed to the DB information composing unit 26.

Figure 11:
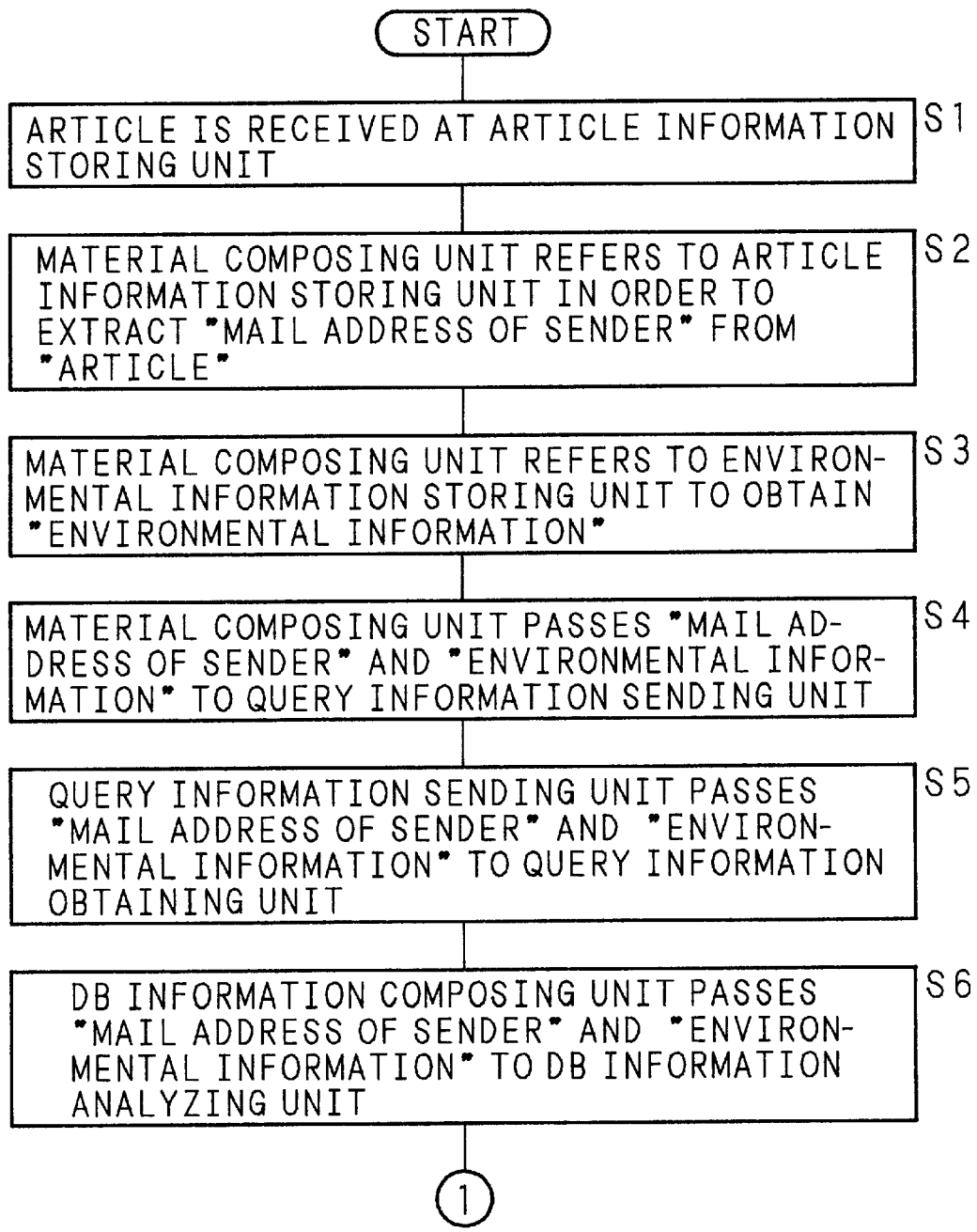
FIG. 11 is a (first) flowchart showing an operation of the communication apparatus according to the present invention.
Figure 12:
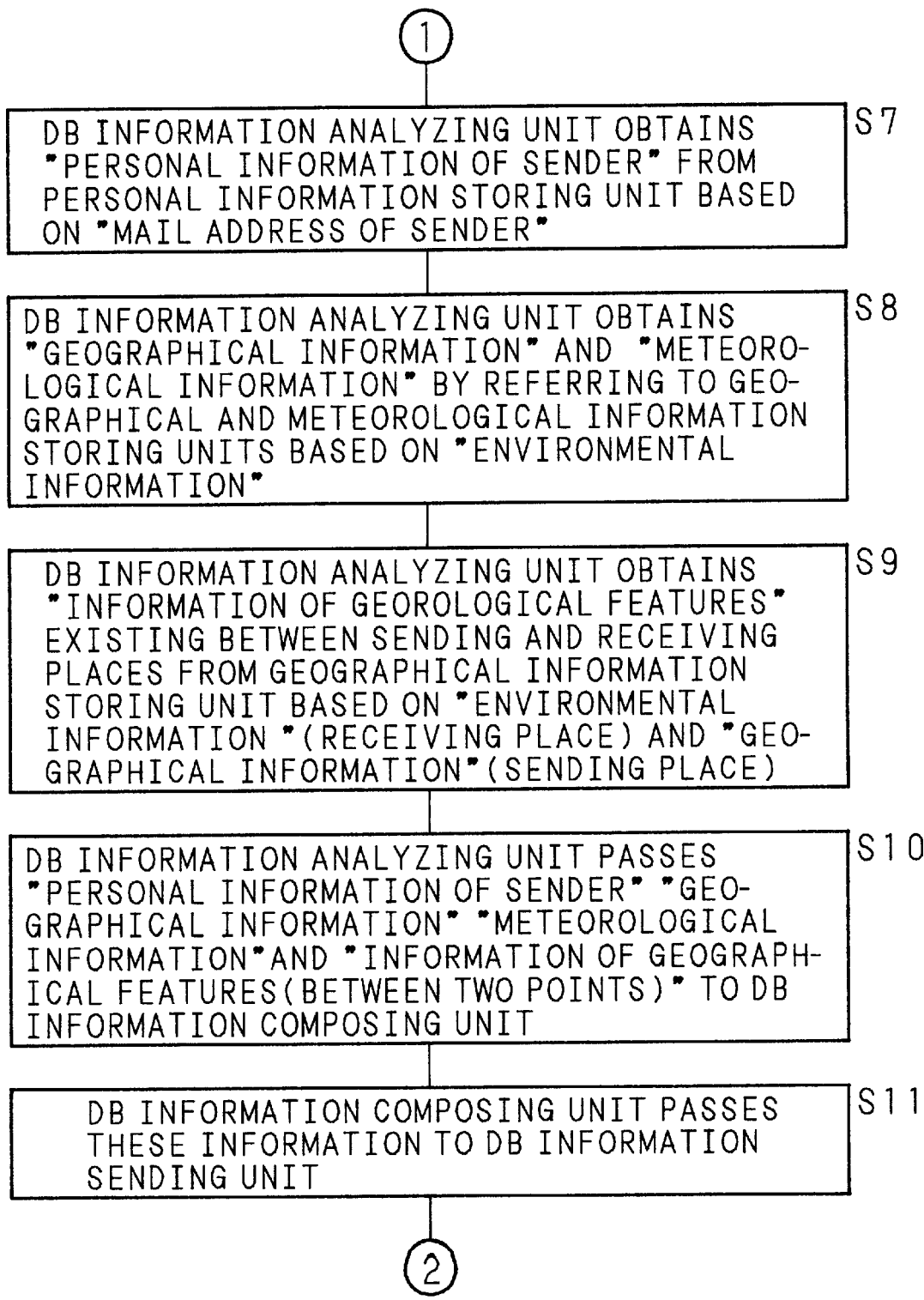
FIG. 12 is a (second) flowchart showing an operation of the communication apparatus according to the present invention.
Figure 13:
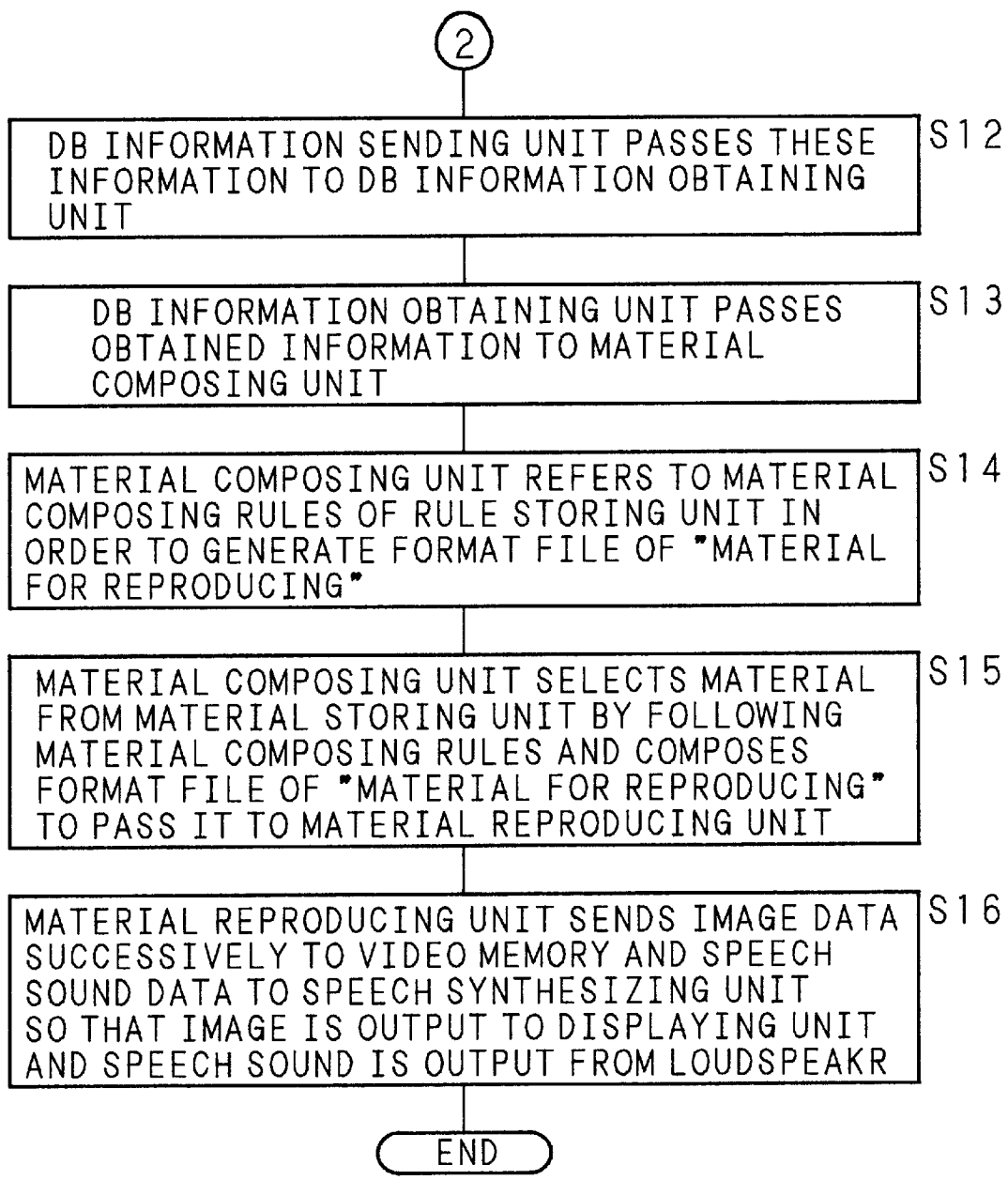
FIG. 13 is a (third) flowchart showing an operation of the communication apparatus according to the present invention.

Next, the operation of the apparatus of the present invention will be explained with reference to the flowcharts of FIG. 11 through FIG. 13, taking embodiment 2 as an example.

If an "article" is received at the article information storing unit 4 (Step S1), the material composing unit 6 refers to the article information storing unit 4 in order to extract a "mail address of sender" from the "article" (Step S2).

The material composing unit 6 takes reference to the environmental information storing unit 3 to obtain "environmental information" (Step S3). The material composing unit 6 passes the "mail address of sender" and "environmental information" to the query information sending unit 7 (Step S4).

The query information sending unit 7 sends out the "mail address of sender" and "environmental information" to the query information obtaining unit 25 (Step S5). The DB information composing unit 26 passes the "mail address of sender" and "environmental information" to the DB information analyzing unit 29 (Step S6).

The DB information analyzing unit 29 obtains "personal information of the sender" from the personal information storing unit 21 based on the "mail address of senders " (Step S7). The DB information analyzing unit 29 further obtains "geographical information" and "meteorological information" by referring to the geographical information storing unit 22 and meteorological information storing unit 23 based on the "environmental information" (Step S8).

Moreover, the DB information analyzing unit 29 obtains "information of geographical features" existing between the sending place and receiving place from the geographical information storing unit 22, based on the "environmental information" (receiving place) and "geographical information" (sending place)(Step S9). The DB information analyzing unit 29 passes the "personal information of sender", "geographical information", "meteorological information", and "information of geographical features (existing between the sending place and receiving place)" to the DB information composing unit 26 (Step S10).

The DB information composing unit 26 then passes these information to the DB information sending unit 28 (Step S11), and the DB information sending unit 28, in turn, to the DB information obtaining unit 8 (Step S12).

The DB information obtaining unit 8 passes the obtained information to the material composing unit 6 (Step S13). The material composing unit 6 refers to the material composing rules of the rule storing unit 5 in order to generate a format file of a "material for reproducing" (Step S14).

The material composing unit 6 selects a material from the material storing unit 1 by following the material composing rules and composes a format file of the "material for reproducing" to pass it to the material reproducing unit 9 (Step S15).

The material reproducing unit 9 respectively sends image data successively to the video memory 10 and speech sound data to the speech synthesizing unit 11, so that an image, which is a material representing who has sent the article from what kind of place beyond what kind of geographical space, is output to the displaying unit 12, and a speech sound is output from the loudspeaker 13 (Step S16).

It should be noted that the above-described embodiment has been explained taking a communication system of client-server type as an example, but the apparatus of the present invention is not necessarily limited to this type, and the data held by the server may be held by a terminal equipment which is the client itself.

[Display Examples]

FIGS. 3 to 10 are diagrams showing display examples of reproduced materials.

Figure 3:
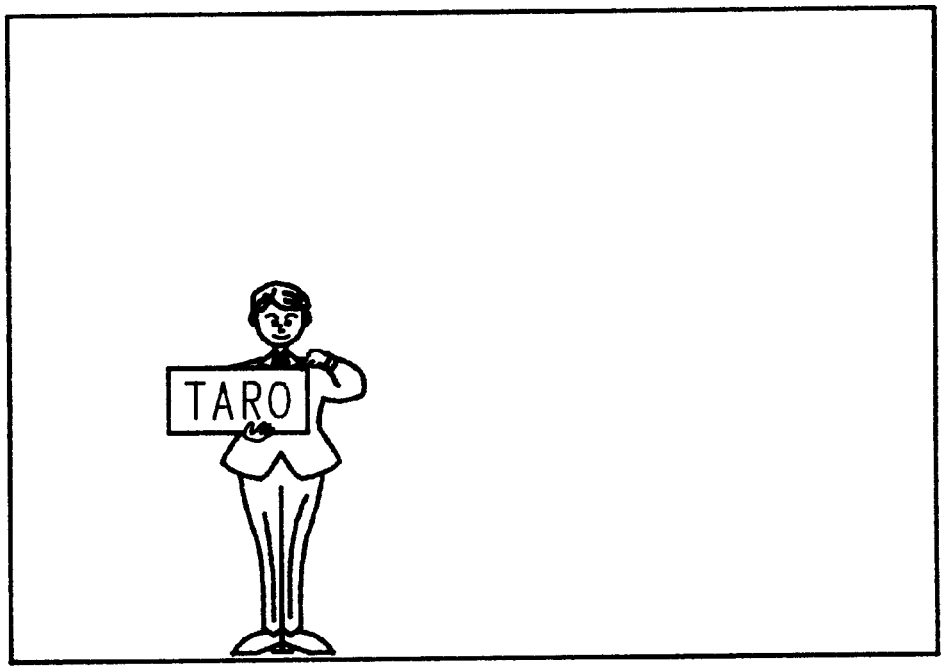
FIG. 3 is a diagram showing a display example of a material (name)

FIG. 3 is a display example in which the name of the sending/addressee is "TARO". It should be noted that if this is the name of the addressee, an addressing sound "Mr. TARO" may be output along with the image.

Figure 4:
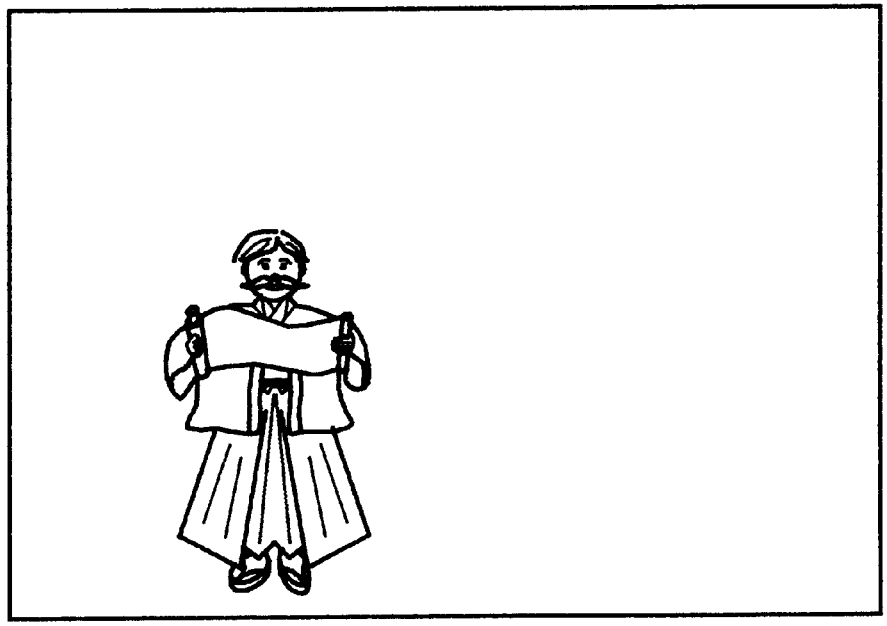
FIG. 4 is a diagram showing a display example of a material (age)
Figure 5:
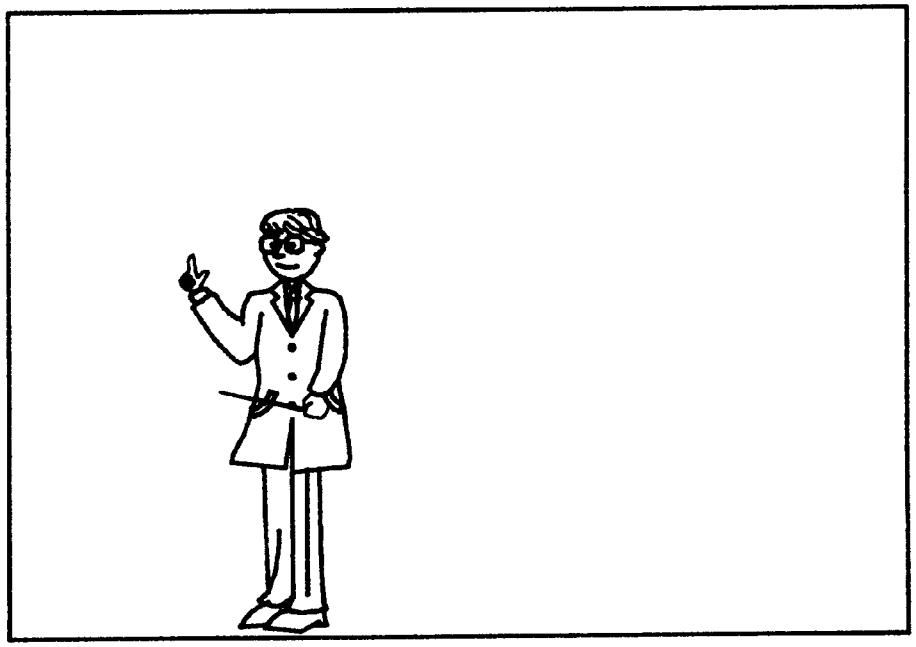
FIG. 5 is a diagram showing a display example of a material (belonging organization)
Figure 6:
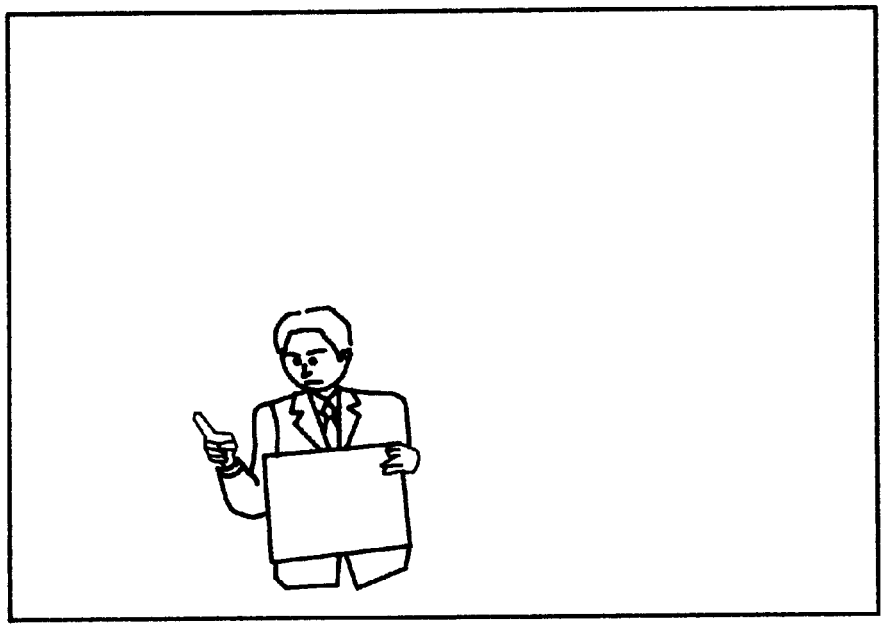
FIG. 6 is a diagram showing a display example of a material (address)

FIG. 4 is a display example in which the sending/addressee is aged "60", FIG. 5 a display example in which the belonging organization of the sending/addressee is "hospital", and FIG. 6 a display example in which the address of the sending/addressee is "office".

In any of FIGS. 4 to 6, a speech sound may be output along with the image, as in the case of FIG. 3.

Figure 7:
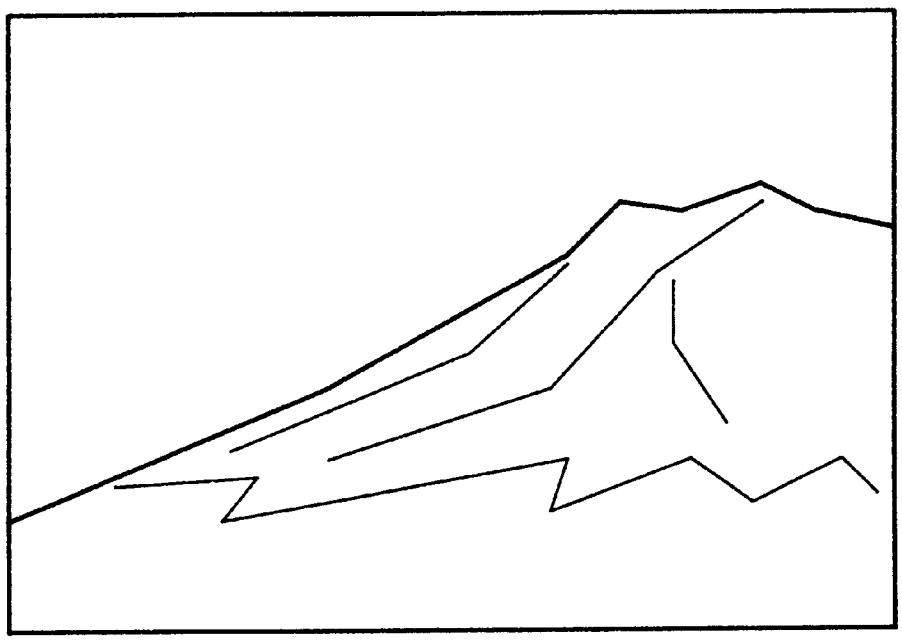
FIG. 7 is a diagram showing a display example of a material (geographical features)
Figure 8:
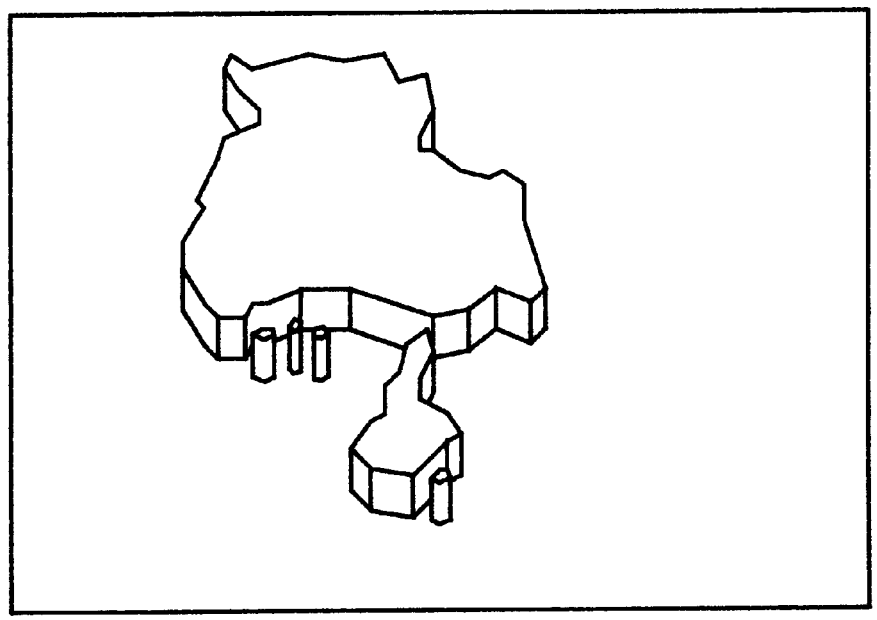
FIG. 8 is a diagram showing a display example of a material (place name)
Figure 9:
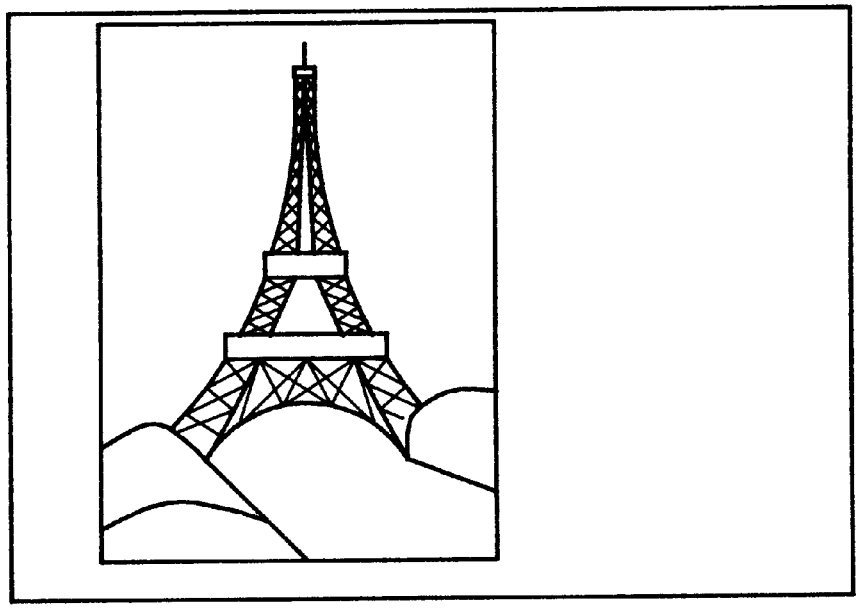
FIG. 9 is a diagram showing a display example of a material (structure)
Figure 10:
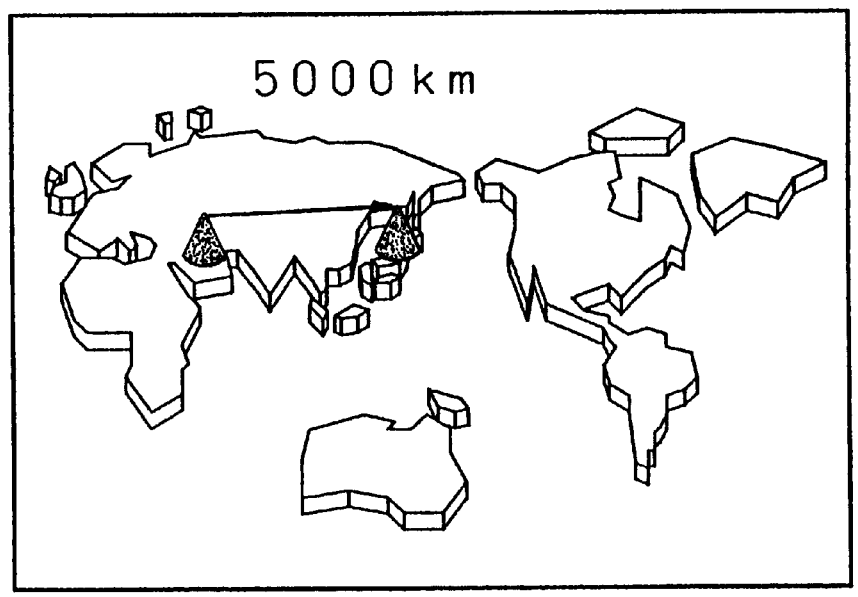
FIG. 10 is a diagram showing a display example of a material (distance)

FIG. 7 is a display example in which the geographical features of the sending place or that between the places of sending/receiving (referred to as "two points") is "mountains", FIG. 8 a display example in which the name of the sending place/the place between the two points is "Hyogo Prefecture", FIG. 9 a display example in which the characteristic structure existing at or around the sending place/the place between the two points is "the Eiffel Tower", and FIG. 10 a display example of the distance between the two points.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication apparatus, comprising:
   a first memory for storing attribute information of a sender of an article;
   first means for obtaining particular attribute information stored in said first memory identified as that of the sender of a received article by extracting sub-information specifying the sender from the received article;
   a second memory for storing materials about the sender, a receiver, and environments thereof, including at least one of still pictures, animations and sounds;
   a third memory for storing rules for selecting materials corresponding to the attribute information;
   second means for selecting the particular material from said second memory to compose the particular material for reproduction in accordance with the particular attribute information obtained by said first means by referring to a rule stored in said third memory corresponding to the particular attribute information; and
   third means for reproducing the particular material composed by said second means as representing the received article sent from the sender.

2. The communication apparatus according to claim 1, wherein the attribute information is personal information of a person who sent the article.

3. The communication apparatus of claim 2, wherein the personal information is a name of the person who sent the article.

4. The communication apparatus of claim 2, wherein the personal information is the gender of the person who sent the article.

5. The communication apparatus of claim 2, wherein the personal information is a belonging organization of the person who sent the article.

6. The communication apparatus of claim 2, wherein the personal information is an address of the person who sent the article.

7. The communication apparatus of claim 1, wherein the attribute information is environmental information of a place from which the article has been sent.

8. The communication apparatus of claim 7, wherein the environmental information is meteorological information of the place from which the article has been sent.

9. The communication apparatus of claim 7, wherein the environmental information is geographical information of the place from which the article has been sent.

10. The communication apparatus of claim 9, wherein the geographical information is information of a geographical feature of the place from which the article has been sent.

11. The communication apparatus of claim 9, wherein the geographical information is a city name of the place from which the article has been sent.

12. The communication apparatus of claim 9, wherein the geographical information is information of a structure existing at or around the place from which the article has been sent.

13. A communication apparatus, comprising:
   a first memory for storing attribute information of a sender of an article;
   a second memory for storing attribute information of an addressee of the article;
   first means for obtaining sender attribute information stored in said first memory identified as that of the sender of a received article by extracting sub-information specifying the sender from the received article, and obtaining addressee attribute information from said second memory;
   a third memory for storing materials about the sender, the addressee, and environments thereof, including at least one of still pictures, animations and sounds;
   a fourth memory for storing rules for selecting materials, whereby a particular material corresponding to the sender and addressee attribute information may be selected;
   second means for selecting the particular material from said third memory to compose the particular material for reproduction in accordance with the sender and addressee attribute information obtained by said first means by referring to a rule stored in said fourth memory corresponding to the sender and addressee attribute information; and
   third means for reproducing the particular material composed by said second means, upon receipt of the received article from the sender, as representing the received article sent from the sender.

14. The communication apparatus according to claim 13, further comprising: means for obtaining geographical information of a geographical relationship between a sending place and a receiving place by analyzing the geographical information of the sending place and the receiving place,
   wherein said fourth memory stores therein the rules for selecting materials corresponding to the geographical information of the geographical relationship, and
   wherein said second means includes means for composing the particular material to be reproduced by selecting the particular material from said third memory corresponding to the geographical information of the geographical relationship by following the rules corresponding to the geographical information of the geographical relationship.

15. The communication apparatus according to claim 14, wherein the geographical information of the geographical relationship is a distance between the sending place and the receiving place.

16. The communication apparatus according to claim 14, wherein the geographical information of the geographical relationship is information concerning geographical features of land existing between the sending place and the receiving place.

17. The communication apparatus according to claim 14, wherein the geographical information of the geographical relationship is information concerning a structure existing between the sending place and receiving place.

18. The communication apparatus according to claim 14, wherein the geographical information of the geographical relationship is a city name existing between the sending place and the receiving place.

19. A method for transmitting an article between a sender and a receiver, comprising:
   storing attribute information of the sender of the article, material information for the sender and the receiver, and rules for selecting the material information, the material information including at least one of still pictures, animations and sounds;
   selecting at least one item of the material information based on sender attribute information corresponding to a sender identification extracted from the article after receipt by the receiver; and
   producing a representation of the article based the at least one item of the material information.

20. At least one computer program, embodied on a computer-readable medium, for transmitting an article between a sender and a receiver, comprising:

storing attribute information of the sender of the article, material information for the sender and the receiver, and rules for selecting the material information, the material information including at least one of still pictures, animations and sounds;

selecting at least one item of the material information based on sender attribute information corresponding to a sender identification extracted from the article after receipt by the receiver; and producing a representation of the article based the at least one item of the material information.

* * * * *